UNITED STATES PATENT OFFICE.

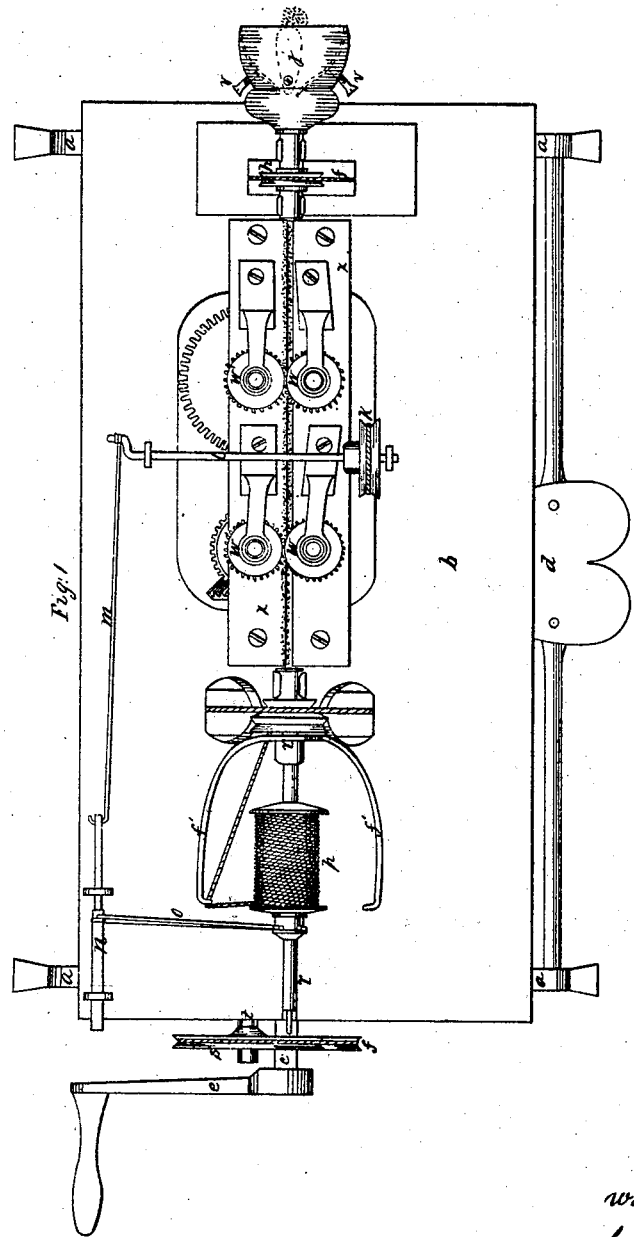

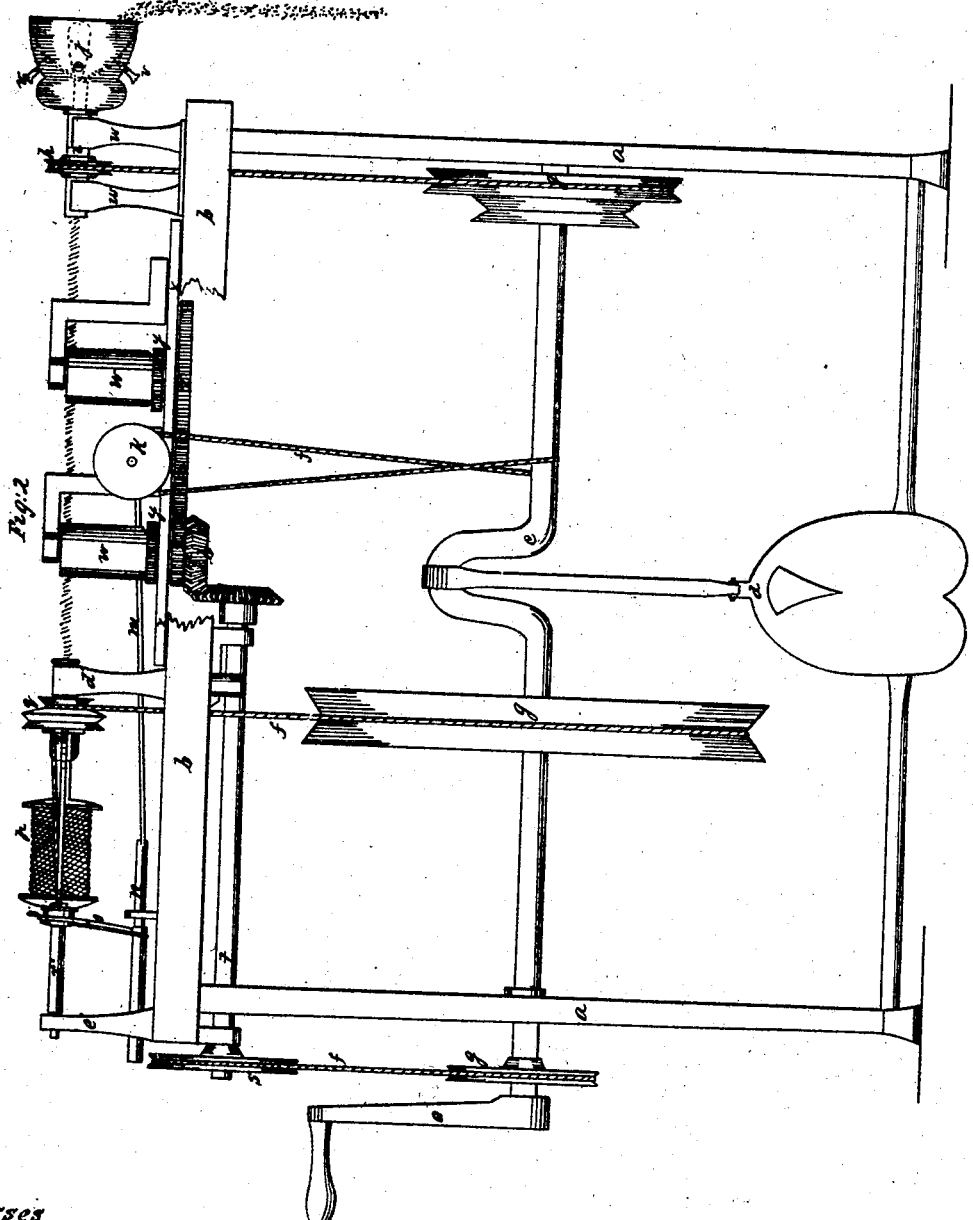

WM EBERHARD, OF SIGOURNEY, IOWA.

IMPROVEMENT IN SPINNING-MACHINES.

Specification forming part of Letters Patent No. 48,917, dated July 25, 1855.

*To all whom it may concern:*

Be it known that I, WILLIAM EBERHARD, of the town of Sigourney, in the county of Keokuk and State of Iowa, have invented a certain new and useful Improvement on Spinning-Machines; and I do hereby declare that the following is a full, clear, and exact description of the construction and operation of the same, reference being had to the accompanying drawings, and to the letters and marks thereon.

The drawings forming part of this specification represent a machine constructed under my invention, Figure 1 being a top view thereof, and Fig. 2 being a side view, with a portion of the top plate or platform removed, so as to show the gearing underneath.

To a frame-work, $a$, having a top plate or platform, $b$, there is connected a crank-shaft, $c$, which may be rotated by a treadle, $d$, a hand-crank, $e$, or by any suitable means driven by machine-power. Bands $f$ around pulleys $g$, attached to the crank-shaft, operate certain movable parts of the machine, as is clearly indicated by the drawings. One band passes around the pulley $h$ on the short tubular shaft $i$, for rotating that shaft and the feeding-head $j$ thereon; another band passes around the pulley $k$ for rotating the shaft $l$, which, by means of the connecting-rod $m$, slide $n$, and fingers $o$, move the spool $p$ backward and forward; another band passes around the pulley $q$ for giving rotation to the spindle-head $r$, while a fourth band passes around the pulley $s$ for rotating the shaft $t$, which, through gearing, operates the drawing-rollers. Upon part or all of the shafts here named two or more pulleys may be placed, to provide for increasing or diminishing the speed of the shafts, as is indicated on the main shaft and on the head of the spindles.

The feeding-head $j$, with its shaft and pulley, may be made in one piece, or of separate pieces properly united together, and may be of the form represented by the drawings, or of a form differing from it but retaining its main features. The shaft of the feeding-head rests in suitable bearings in the standards or uprights $u$, which are affixed to the top plate or platform, and in which bearings the shaft rotates. From these bearings the shafts may readily be detached. The head $j$ is somewhat funnel-shaped, its sides widening out from its central opening or throat, and there are affixed to its inner surface flat springs attached to the edge of the head by rivets, and which taper down to the throat, thus forming the space or channel through which the roll is fed in. These springs are fully indicated by the colored dotted lines in the drawings. Set-screws $v$ control these springs, and through or by them the channel may be increased or diminished in order to adapt the channel to the size of the roll used and to the material being operated upon, as the machine may be used for spinning wool, cotton, hemp, flax, or any other material desired to be spun. Other means than the springs and set-screws may be used to vary the size of the channel.

There are two sets of the drawing-rollers $w\ w'$ shown; but, as is evident, more may be used, the diameter and size of these rollers, as well as their number, being regulated according to the size of the machine and the material used for spinning or being spun. The upper ends of these rollers have bearings in Z-shaped bars, which are affixed to plates $x$ attached to the top plate, their lower ends having bearings in the plates $x$. These bearings may be made adjustable, so that the space between the rollers be increased or diminished, as may be required. To the lower ends of these rollers are affixed gearing-wheels $y$, which may be detachable, and by which one side of the two sets of the rollers give rotation to the rollers of the other side. The rollers $w'$ have affixed to their lower ends, below the plates $x$, geared wheels, $z\ z'$, between which there is a connecting-wheel, $a'$, attached to the plate $x$. That roller of the set $w'$ which is nearest to the shaft $t$ also has a beveled wheel, $b'$, gearing in with another beveled wheel, $c'$, on the end of the shaft $t$. These wheels and beveled wheels may be so made as to be easily detached in order to adapt them to different drawing-rollers, and in order, also, to increase or diminish the speed of the drawing-rollers, so that other sets of rollers and wheels may be used on the machine.

The shaft $r'$ of the spindle-head and spool has a bearing at one end in the standard $d'$, and at the other end in the standard $e'$, both standards being suitably connected to the top plate, $b$.

To the spindle-head are attached fingers $f'$, and a hole in the head of the spindle and through the head end of the shaft, allows of the passage of the yarn or thread on its way through the end of the finger to the spool, as is fully represented by Fig. 1 of the drawings.

The various and several parts of this machine may be made of any of the materials usually employed in the construction of machines of this class. Many if not all of the parts or pieces may be made by castings of iron or other metal; and two or more machines can be used arranged upon a common platform, either in connection with other machines for knitting, weaving, twisting, &c., or independently, as may be preferred.

In using this machine a piece of yarn or thread can be passed through the head between the drawing-rollers, and through the hole in the head and pulley of the spindle and one of the fingers to the spool. To the outer end of this thread the roll or material to be spun in suitable condition can be attached, the mouth or entrance to the channel of the head and hollow shaft being properly proportioned by the springs and set-screws, and the drawing-rollers being put in the proper condition, so that the feeding in of the roll and the degree of twisting there performed and the degree of drawing exercised by the rollers shall be duly and correctly adapted to the work to be done. Then, upon the rotation of the crank-shaft, the head is rotated, the rollers revolved, the spindle rotated, and the spool moved backward and forward on the shaft, and the machine made to produce from the roll or other material the yarn or the thread in the perfected condition.

What I claim as my invention, and desire to secure by Letters Patent, is—

In combination with the feeding head and the drawing-rollers, the spindle and spool arranged and operated as set forth.

This specification signed this 7th day of April, 1865.

WILLIAM EBERHARD.

Witnesses:
THOS. T. EVERETT,
GEO. C. LAMBRIGHT.